(12) United States Patent
 Valeski

(10) Patent No.: US 11,924,224 B2
(45) Date of Patent: Mar. 5, 2024

(54) PROCESSING EXTERNAL MESSAGES USING A SECURE EMAIL RELAY

(71) Applicant: Proofpoint, Inc., Sunnyvale, CA (US)

(72) Inventor: Ashley Harlow Valeski, Denver, CO (US)

(73) Assignee: Proofpoint, Inc., Sunnyvale, CA (US)

( * ) Notice: Subject to any disclaimer, the term of this patent is extended or adjusted under 35 U.S.C. 154(b) by 169 days.

(21) Appl. No.: 17/306,524

(22) Filed: May 3, 2021

(65) Prior Publication Data
US 2022/0070177 A1    Mar. 3, 2022

Related U.S. Application Data

(60) Provisional application No. 63/071,411, filed on Aug. 28, 2020.

(51) Int. Cl.
*H04L 9/40* (2022.01)
(52) U.S. Cl.
CPC ............ *H04L 63/126* (2013.01); *H04L 63/08* (2013.01)
(58) Field of Classification Search
CPC ....... H04L 51/48; H04L 63/126; H04L 63/08; H04L 51/212; H04L 51/23
USPC ........................................................... 726/7
See application file for complete search history.

(56) References Cited

U.S. PATENT DOCUMENTS 9,781,149 B1 * 10/2017 Himler ................ H04L 63/1425
10,904,012 B1 * 1/2021 Duncan ................ H04L 63/126
2017/0034100 A1 2/2017 Zink et al.

OTHER PUBLICATIONS

Jan. 18, 2022—(EP) Extended Search Report—App 21193506.9.
Scott Rose et al., "Trustworthy email NIST SP 800-177r1", NIST, National Institute of Standards and Technology, Feb. 26, 2019, pp. 1-128.

* cited by examiner

*Primary Examiner* — Benjamin A Kaplan
(74) *Attorney, Agent, or Firm* — Elizabeth A. Almeter

(57) ABSTRACT

Aspects of the disclosure relate to processing external messages using a secure email relay. A computing platform may receive, from a message source server associated with a first domain, a first email message and a first set of authentication credentials. Based on validating the first set of authentication credentials, the computing platform may inject, into the first email message, a DomainKeys Identified Mail (DKIM) signature of a second domain different from the first domain, which may produce a signed message that identifies itself as originating from the second domain. Based on scanning and validating content of the signed message, the computing platform may send the signed message to a message recipient server, which may cause the message recipient server to validate the DKIM signature of the signed message and determine that the signed message passes Domain-based Message Authentication, Reporting and Conformance (DMARC) with respect to the second domain.

20 Claims, 5 Drawing Sheets

PROCESSING EXTERNAL MESSAGES USING A SECURE EMAIL RELAY

CROSS-REFERENCE TO RELATED APPLICATIONS

This application claims the benefit of and is a non-provisional of U.S. Provisional Patent Application Ser. No. 63/071,411, filed Aug. 28, 2020, and entitled "Processing External Messages Using A Secure Email Relay." Each of the foregoing application(s) is incorporated by reference herein in its entirety.

TECHNICAL FIELD

Aspects of the disclosure relate to digital data processing systems, data processing methods, cybersecurity, and preventing unauthorized access to secure information systems and resources. In particular, one or more aspects of the disclosure relate to processing external messages using a secure email relay.

BACKGROUND

An enterprise organization may seek to prevent its legitimate domain(s) from being spoofed. To do this, the organization might need all traffic that is legitimately using its domain(s) to pass authentication. In the context of enterprise email, this authentication-based approach to preventing spoofing works in a pre-cloud world in which the vast majority of email messages originate on the organization's own enterprise computer systems and within the organization's own firewalls. In the post-cloud world that exists today, however, email messages that may be legitimately using an enterprise organization's domain might no longer originate only from the organization's own enterprise computer systems and within the organization's own firewalls. Instead, such messages may originate from various third-party sender organizations and/or their own cloud platform hosts. And frequently, it might not be possible for such third-party sender organizations to authenticate the email messages that they may be legitimately sending on behalf of the enterprise organization.

SUMMARY

One or more aspects of the disclosure address one or more of these and/or other problems, and their associated technical implementation challenges, by providing a secure email relay for authenticating and/or otherwise processing messages that may be sent on behalf of an enterprise organization yet originate outside of the organization's own secure computing environment.

In accordance with one or more embodiments, a computing platform having at least one processor, a communication interface, and memory may receive, via the communication interface, from a message source server associated with a first domain, a first email message and a first set of authentication credentials. Subsequently, the computing platform may validate the first set of authentication credentials. Based on validating the first set of authentication credentials, the computing platform may inject, into the first email message, a DomainKeys Identified Mail (DKIM) signature of a second domain different from the first domain, where injecting the DKIM signature of the second domain into the first email message produces a first signed message that identifies itself as originating from the second domain. Then, the computing platform may scan content of the first signed message, where scanning the content of the first signed message produces first scan results. The computing platform may validate the first scan results. Based on validating the first scan results, the computing platform may send, via the communication interface, to a message recipient server, the first signed message. In addition, by sending the first signed message to the message recipient server, the computing platform may cause the message recipient server to validate the DKIM signature of the first signed message and determine, based on validating the DKIM signature of the first signed message, that the first signed message passes Domain-based Message Authentication, Reporting and Conformance (DMARC) with respect to the second domain.

In some embodiments, the first domain may be a domain name corresponding to a first entity, and the first email message may include information identifying the first email message's Envelope From domain (RFC.5321) as the domain name corresponding to the first entity. In addition, the second domain may be a domain name corresponding to a second entity different from the first entity, and the first email message may include information identifying the first email message's Header From domain (RFC.5322) as the domain name corresponding to the second entity.

In some embodiments, the second entity may be an organization, and the first entity may be a third-party service provider to the organization. Thus, the first domain may be a domain name corresponding to the third-party service provider to the organization (e.g., "example-service-provider.com"), and the second domain may be a domain name corresponding to the organization (e.g., "example-customer-of-the-service-provider.com").

In some embodiments, validating the first set of authentication credentials may include comparing the first set of authentication credentials received from the message source server associated with the first domain with pre-established credentials provided to one or more authorized users of a secure email relay service hosted on the computing platform.

In some embodiments, scanning the content of the first signed message may include executing an antispam-antivirus scan on the content of the first signed message.

In some embodiments, sending the first signed message to the message recipient server may cause the message recipient server to validate the DKIM signature of the first signed message by comparing the DKIM signature of the first signed message with a public key linked to the second domain and maintained on a domain name system (DNS) server.

In some embodiments, sending the first signed message to the message recipient server may cause the message recipient server to provide a recipient user with access to the first signed message based on the first signed message passing DMARC with respect to the second domain.

In some embodiments, sending the first signed message to the message recipient server may cause the message recipient server to provide the recipient user with access to the first signed message by adding the first signed message to a mail folder accessible to the recipient user without quarantining the message.

In some embodiments, sending the first signed message to the message recipient server may cause the message recipient server to provide the recipient user with access to the first signed message by sending the first signed message to a recipient user device.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Figure 1:
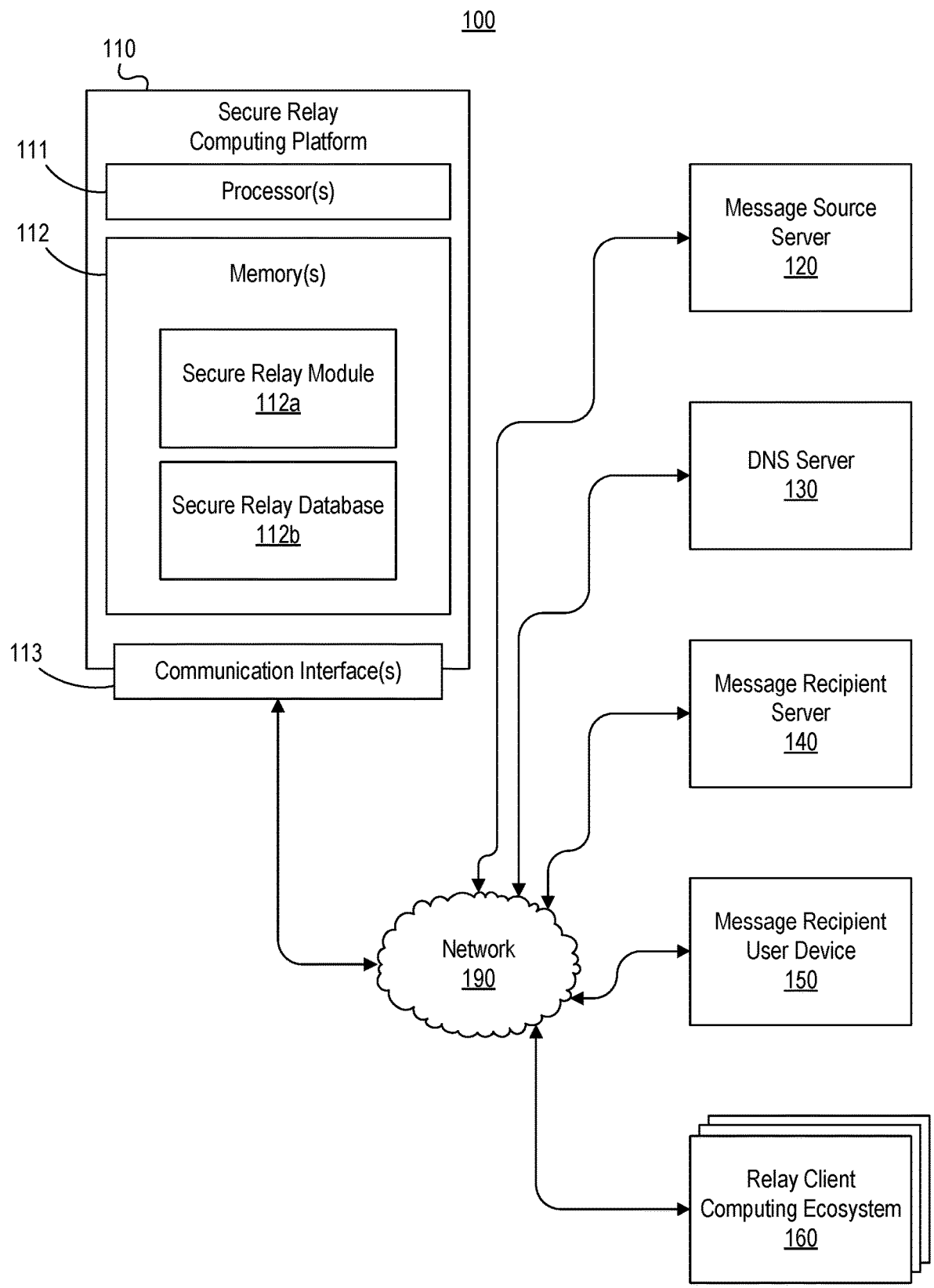
FIG. 1 depicts an illustrative operating environment for processing external messages using a secure email relay in accordance with one or more example embodiments.

FIG. 1 depicts an illustrative operating environment for processing external messages using a secure email relay in accordance with one or more example embodiments. Referring to FIG. 1, computing environment 100 may include various computer systems, computing devices, networks, and/or other operating infrastructure. For example, computing environment 100 may include secure relay computing platform 110, message source server 120, DNS server 130, message recipient server 140, message recipient user device 150, relay client computing ecosystem 160, and network 190.

Network 190 may include one or more wired networks and/or one or more wireless networks that interconnect secure relay computing platform 110, message source server 120, DNS server 130, message recipient server 140, message recipient user device 150, relay client computing ecosystem 160, and/or other computer systems and/or devices. In addition, each of secure relay computing platform 110, message source server 120, DNS server 130, message recipient server 140, message recipient user device 150, and relay client computing ecosystem 160 may be special purpose computing devices configured to perform specific functions, as illustrated in greater detail below, and may include specific computing components such as processors, memories, communication interfaces, and/or the like.

Secure relay computing platform 110 may include one or more processor(s) 111, one or more memory(s) 112, and one or more communication interface(s) 113. In some instances, secure relay computing platform 110 may be made up of a plurality of different computing devices (e.g., a cloud-based server platform), which may be distributed within a single data center or a plurality of different data centers. In these instances, the one or more processor(s) 111, one or more memory(s) 112, and one or more communication interface(s) 113 included in secure relay computing platform 110 may be part of and/or otherwise associated with the different computing devices that form secure relay computing platform 110.

In one or more arrangements, processor(s) 111 may control operations of secure relay computing platform 110. Memory(s) 112 may store instructions that, when executed by processor(s) 111, cause secure relay computing platform 110 to perform one or more functions, as discussed below. Communication interface(s) 113 may include one or more wired and/or wireless network interfaces, and communication interface(s) 113 may connect secure relay computing platform 110 to one or more networks (e.g., network 190) and/or enable secure relay computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause secure relay computing platform 110 to perform various functions) and/or databases (which may, e.g., store data used by secure relay computing platform 110 in performing various functions). For example, memory(s) 112 may store and/or otherwise provide a secure relay module 112a and a secure relay database 112b. In some instances, secure relay module 112a may store instructions that cause secure relay computing platform 110 to execute one or more of the functions described herein. Additionally, secure relay database 112b may store data that is used by secure relay computing platform 110 in executing one or more of the functions described herein.

Message source server 120 may include one or more processors, memories, communication interfaces, and/or other computer components. In addition, message source server 120 may be linked to a third-party service provider, such as a marketing service provider or vendor, which may be authorized to send email messages and/or other communications on behalf of an enterprise organization (e.g., using one or more domains of the enterprise organization). Domain Name System (DNS) server 130 may include one or more processors, memories, communication interfaces, and/or other computer components. In addition, DNS server may operate as an Internet name server and may be configured to store a public key linked to an enterprise organization, which may be used in authenticating messages, as illustrated in greater detail below.

Message recipient server 140 may include one or more processors, memories, communication interfaces, and/or other computer components. In addition, message recipient server 140 may be configured to provide an email messaging platform that may allow one or more message recipients to receive, compose, access, and/or view one or more email messages and/or other messages. Message recipient user device 150 may include one or more processors, memories, communication interfaces, and/or other computer components. In addition, message recipient user device 150 may be linked to an end user who may receive one or more email messages and/or other messages from message recipient server 140, message source server 120, and/or other systems and/or devices.

Relay client computing ecosystem 160 may include one or more processors, memories, communication interfaces, and/or other computer components. In addition, relay client computing ecosystem 160 may be linked to an enterprise organization, which may authorize one or more third-party service providers to send email messages and/or other communications on its behalf (e.g., using its domains).

Figure 2A:
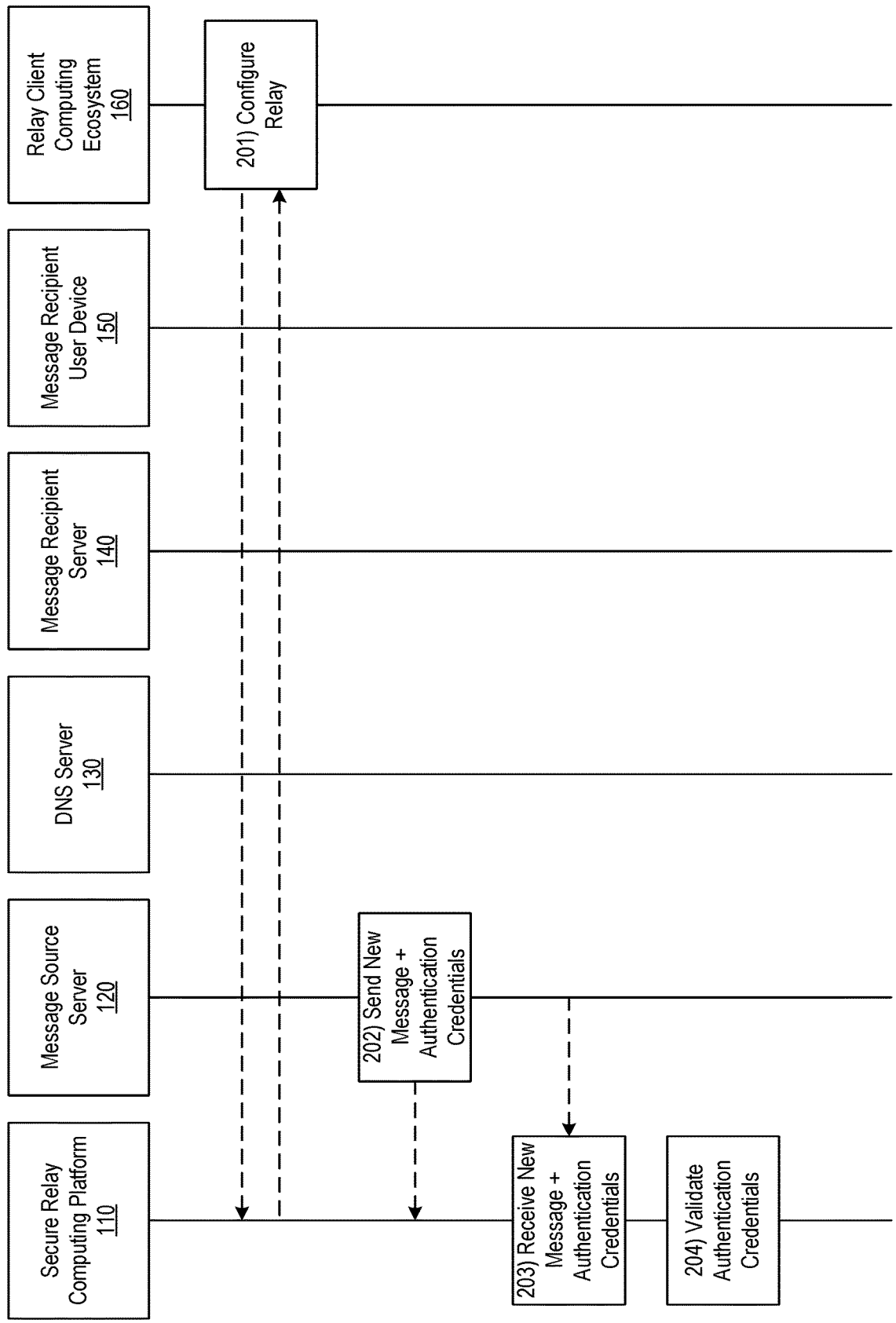
FIGS. 2A-2C depict an illustrative event sequence for processing external messages using a secure email relay in accordance with one or more example embodiments.
Figure 2B:
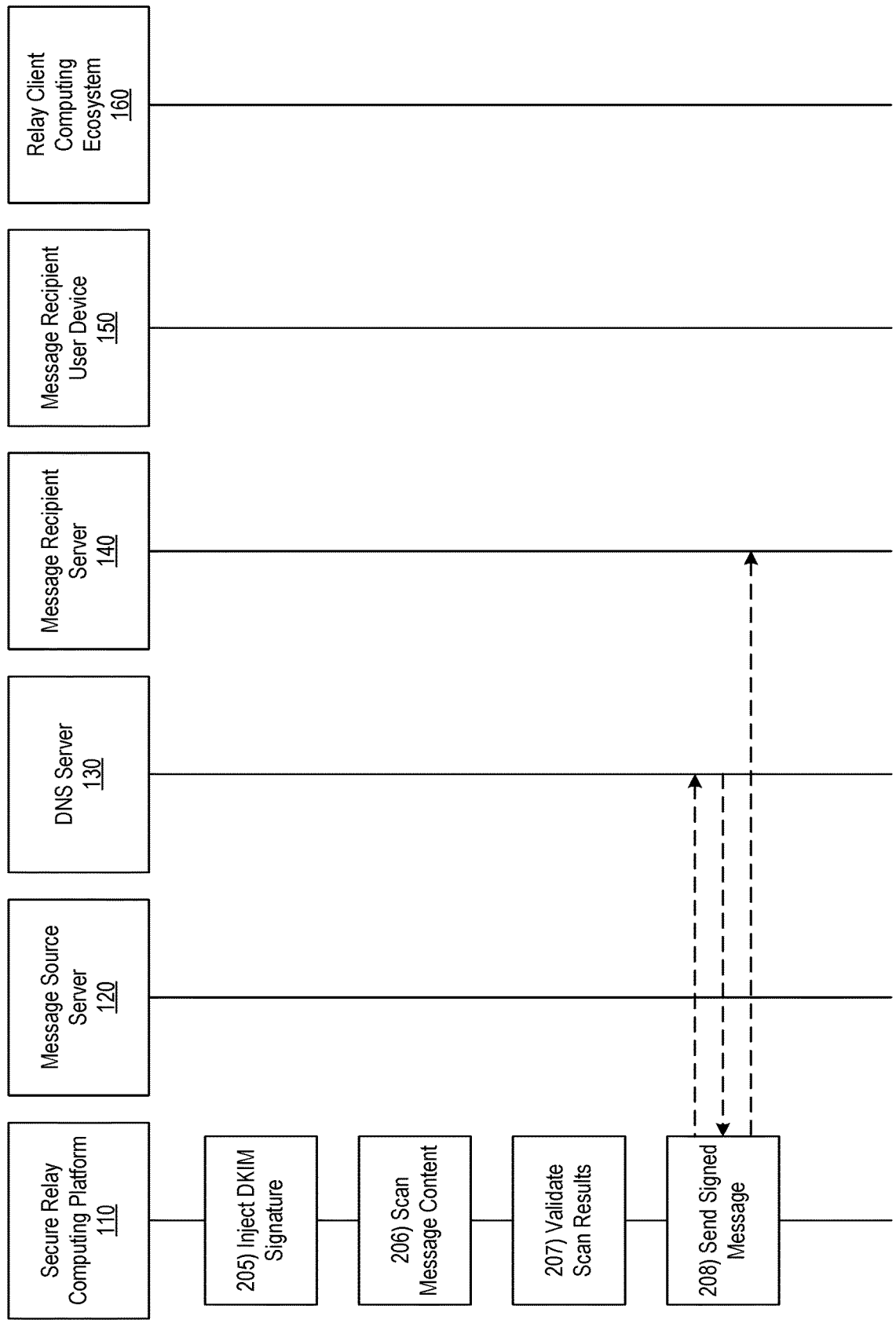
Figure 2C:
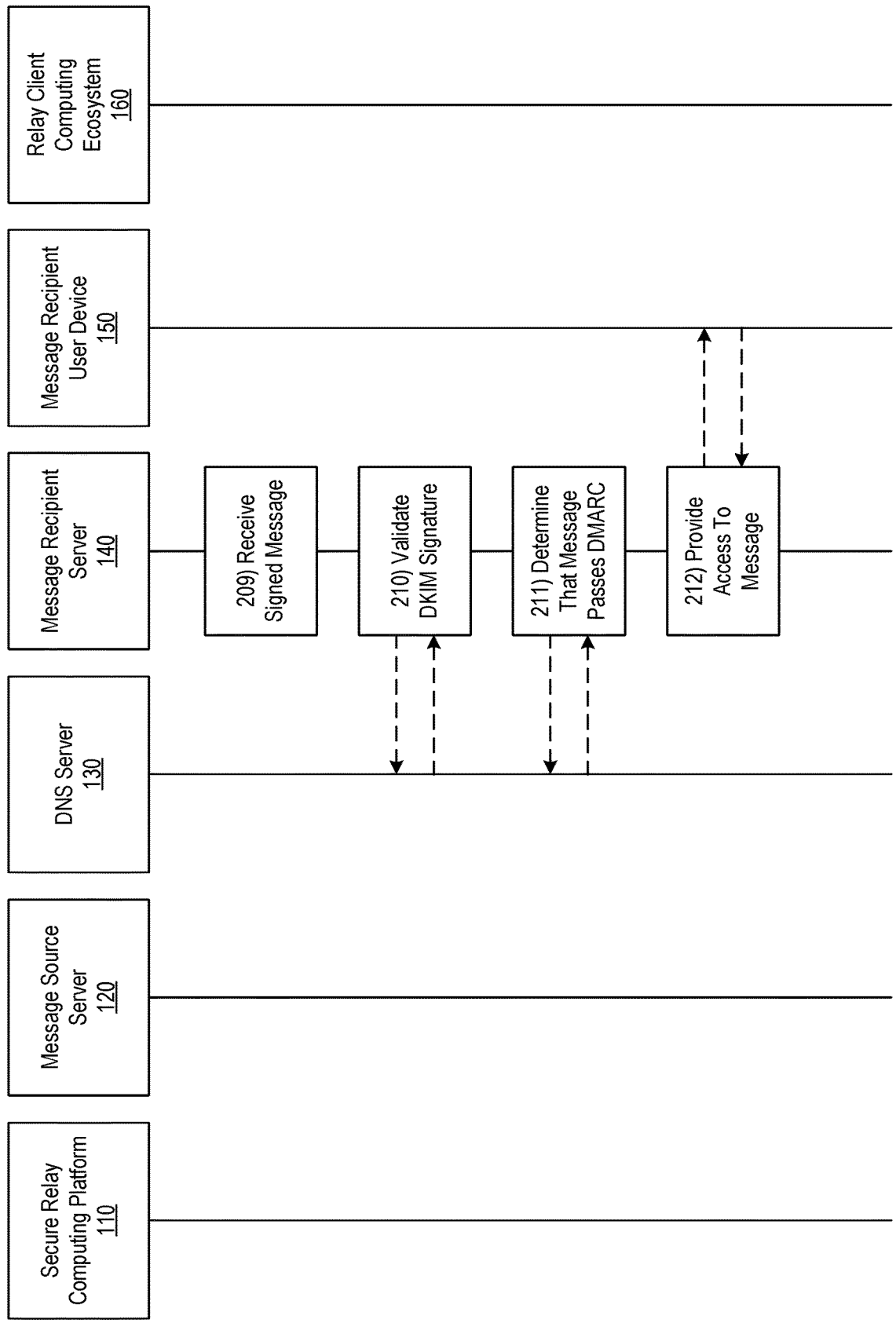

FIGS. 2A-2C depict an illustrative event sequence for processing external messages using a secure email relay in accordance with one or more example embodiments. Referring to FIG. 2A, at step 201, relay client computing ecosystem 160 may configure secure relay computing platform 110. For example, relay client computing ecosystem 160 may define one or more authentication credentials (which may, e.g., be provided to and/or subsequently used by a third-party service provider linked to message source server 120), set one or more private authentication keys on secure relay computing platform 110, set one or more public keys on DNS server 130, and/or perform one or more other initial configuration functions.

At step 202, message source server 120 may send a new message and a set of authentication credentials to secure relay computing platform 110. The authentication credentials may be linked to an enterprise organization associated with relay client computing ecosystem 160 and may enable a service provider linked to message source server 120 to send the new message as originating from the enterprise organization's domain, in a way that passes DMARC, as illustrated in greater detail below. For example, relay client computing ecosystem 160 may be operated by a corporate entity (e.g., Insurance-Company-1) which may have one or more domains (e.g., Insurance-Company-1.com), and message source server 120 may be operated by a service provider (e.g., Service-Provider-1, which may be different from Insurance-Company-1) that may be authorized by Insurance-Company-1 to send email messages to Insurance-Company-1 customers that appear to originate from Insurance-Company-1.com. Thus, message source server 120 may send a new message that includes information identifying an Envelope From domain (RFC.5321) linked to the service provider operating message source server 120 (e.g., Service-Provider-1 in the example above). In addition, this message may include information identifying a Header From domain (RFC.5322) linked to the corporate entity (e.g., Insurance-Company-1 in the example above).

At step 203, secure relay computing platform 110 may receive the new message and authentication credentials from message source server 120. For example, at step 203, secure relay computing platform 110 may receive, via the communication interface (e.g., communication interface 113), from a message source server (e.g., message source server 120) associated with a first domain, a first email message and a first set of authentication credentials.

In some embodiments, the first domain may be a domain name corresponding to a first entity, and the first email message may include information identifying the first email message's Envelope From domain (RFC.5321) as the domain name corresponding to the first entity. In addition, the second domain may be a domain name corresponding to a second entity different from the first entity, and the first email message may include information identifying the first email message's Header From domain (RFC.5322) as the domain name corresponding to the second entity. For example, at step 203, the first domain (which may, e.g., be associated with message source server 120) may be a domain name corresponding to a first entity, and the first email message may include information identifying the first email message's Envelope From domain (RFC.5321) as the domain name corresponding to the first entity. In addition, the second domain (which may, e.g., be associated with the DKIM signature that is injected at step 205 below) may be a domain name corresponding to a second entity different from the first entity, and the first email message may include information identifying the first email message's Header From domain (RFC.5322) as the domain name corresponding to the second entity.

In some embodiments, the second entity may be an organization, and the first entity may be a third-party service provider to the organization. For instance, the first domain may be a domain name corresponding to the third-party service provider to the organization (e.g., "Service-Provider-1.com" in the example above), and the second domain may be a domain name corresponding to the organization (e.g., "Insurance-Company-1.com" in the example above). As illustrated below, secure relay computing platform 110 may enable the third-party service provider to send messages on behalf of the organization that: (1) include a Header From domain (RFC.5322) of the organization; (2) include an Envelope From domain (RFC.5321) of the third-party service provider; and (3) pass DMARC (e.g., because the messages sent by secure relay computing platform 110 will include the DKIM signature of the organization).

At step 204, secure relay computing platform 110 may validate the authentication credentials received from message source server 120 (e.g., to confirm that the received credentials are valid). For example, at step 204, secure relay computing platform 110 may validate the first set of authentication credentials. In some embodiments, validating the first set of authentication credentials may include comparing the first set of authentication credentials received from the message source server associated with the first domain with pre-established credentials provided to one or more authorized users of a secure email relay service hosted on the computing platform. For example, in validating the first set of authentication credentials at step 204, secure relay computing platform 110 may compare the first set of authentication credentials received from the message source server (e.g., message source server 120) associated with the first domain with pre-established credentials provided to one or more authorized users of a secure email relay service hosted on the computing platform (e.g., secure relay computing platform 110). Such credentials may, for instance, be provided to third-party sender(s) associated with the first domain who are authorized to send messages on behalf of an organization associated with the second domain. If the credentials are invalid, secure relay computing platform 110 may generate an error message and the event sequence may end; alternatively, if the results are valid, the event sequence may continue to step 205.

Referring to FIG. 2B, at step 205, secure relay computing platform 110 may inject a DKIM signature into the message received from message source server 120, which may produce a signed message. For example, at step 205, based on validating the first set of authentication credentials, secure relay computing platform 110 may inject, into the first email message, a DomainKeys Identified Mail (DKIM) signature of a second domain different from the first domain. In addition, by injecting the DKIM signature of the second domain into the first email message, secure relay computing platform 110 may produce a first signed message that identifies itself as originating from the second domain. In some instances, the first signed message might identify itself as originating from the second domain because its Header From domain (RFC.5322) is a domain name of the entity associated with the second domain (e.g., an organization), even though its Envelope From domain (RFC.5321) is a domain name of another entity (e.g., a third-party service provider to the organization). In other instances, the first signed message might identify itself as originating from the second domain because both its Header From domain (RFC.5322) and its Envelope From domain (RFC.5321) may be a domain name of the entity associated with the second domain (e.g., the organization).

When injecting the DKIM signature of the second domain into the first email message to produce the first signed message, secure relay computing platform 110 might not modify the Header From (RFC.5322) domain and the Envelope From (RFC.5321) domain of the first email message received from message source server 120. Indeed, once produced by secure relay computing platform 110, the first signed message may include a Header From domain (RFC.5322) of an organization corresponding to the second domain and an Envelope From domain (RFC.5321) of a third-party service provider corresponding to the first domain. When the first signed message is ultimately received at message recipient server 140, however, message recipient server 140 may still determine that the first signed message passes DMARC, as illustrated below, because the first signed message includes the DKIM signature corresponding to the second domain of the organization. In this way, secure relay computing platform 110 may enable the third-party service provider to send a message that appears to originate from the organization but still pass DMARC, because the message includes the DKIM signature. Without the DKIM signature inserted by secure relay computing platform 110, a recipient mail server might treat such a message as spam or other mail that should be quarantined, because the message may appear to be spoofing the domain of the organization (e.g., due to the mismatch between the Header From (RFC.5322) domain and the Envelope From (RFC.5321) domain).

At step 206, secure relay computing platform 110 may scan the contents of the message. For example, at step 206, secure relay computing platform 110 may scan content of the first signed message, and scanning the content of the first signed message may produce first scan results. In some embodiments, scanning the content of the first signed message may include executing an antispam-antivirus scan on the content of the first signed message. For example, in scanning the content of the first signed message at step 206, secure relay computing platform 110 may execute an antispam-antivirus scan on the content of the first signed message. Such a scan may be executed, for instance, using one or more spam and/or virus filters hosted on secure relay computing platform 110 and/or on related computing infrastructure.

At step 207, secure relay computing platform 110 may validate the results of scanning the message (e.g., to confirm that the message does not contain spam, viruses, and/or other harmful content). For example, at step 207, secure relay computing platform 110 may validate the first scan results. If the results are invalid, secure relay computing platform 110 may generate an error message and the event sequence may end; alternatively, if the results are valid, the event sequence may continue to step 208.

At step 208, secure relay computing platform 110 may send the signed message to message recipient server 140. For example, at step 208, based on validating the first scan results, secure relay computing platform 110 may send, via the communication interface (e.g., communication interface 113), to a message recipient server (e.g., message recipient server 140), the first signed message. In addition, by sending the first signed message to the message recipient server (e.g., message recipient server 140), secure relay computing platform 110 may cause the message recipient server (e.g., message recipient server 140) to validate the DKIM signature of the first signed message and determine, based on validating the DKIM signature of the first signed message, that the first signed message passes Domain-based Message Authentication, Reporting and Conformance (DMARC) with respect to the second domain. As illustrated in greater detail below, this may enable a recipient of the message to consider the message as being authenticated and validly sent from the second domain (e.g., even though the message was actually sent by message source server 120, which is linked to the first domain, and was not sent by a server linked to the second domain).

In some embodiments, sending the first signed message to the message recipient server may cause the message recipient server to validate the DKIM signature of the first signed message by comparing the DKIM signature of the first signed message with a public key linked to the second domain and maintained on a domain name system (DNS) server. For example, by sending the first signed message to the message recipient server (e.g., message recipient server 140) at step 208, secure relay computing platform 110 may cause the message recipient server (e.g., message recipient server 140) to validate the DKIM signature of the first signed message by comparing the DKIM signature of the first signed message with a public key linked to the second domain and maintained on a domain name system (DNS) server (e.g., DNS server 130).

In some embodiments, sending the first signed message to the message recipient server may cause the message recipient server to provide a recipient user with access to the first signed message based on the first signed message passing DMARC with respect to the second domain. For example, by sending the first signed message to the message recipient server (e.g., message recipient server 140) at step 208, secure relay computing platform 110 may cause the message recipient server (e.g., message recipient server 140) to provide a recipient user with access to the first signed message based on the first signed message passing DMARC with respect to the second domain.

In some embodiments, sending the first signed message to the message recipient server may cause the message recipient server to provide the recipient user with access to the first signed message by adding the first signed message to a mail folder accessible to the recipient user without quarantining the message. For example, by sending the first signed message to the message recipient server (e.g., message recipient server 140) at step 208, secure relay computing platform 110 may cause the message recipient server (e.g., message recipient server 140) to provide the recipient user with access to the first signed message by adding the first signed message to a mail folder accessible to the recipient user without quarantining the message.

In some embodiments, sending the first signed message to the message recipient server may cause the message recipient server to provide the recipient user with access to the first signed message by sending the first signed message to a recipient user device. For example, by sending the first signed message to the message recipient server (e.g., message recipient server 140) at step 208, secure relay computing platform 110 may cause the message recipient server (e.g., message recipient server 140) to provide the recipient user with access to the first signed message by sending the first signed message to a recipient user device (e.g., message recipient user device 150).

Referring to FIG. 2C, at step 209, message recipient server 140 may receive the first signed message from secure relay computing platform 110. At step 210, message recipient server 140 may validate the DKIM signature included in the first signed message. For example, message recipient server 140 may compare the DKIM signature of the first signed message with a public key linked to the second domain and maintained on DNS server 130. If the DKIM signature is invalid, message recipient server 140 may determine that the message fails DMARC and may execute one or more actions accordingly (e.g., message recipient server 140 may quarantine the message); alternatively, if the DKIM signature is valid, the event sequence may continue to step 211.

At step 211, message recipient server 140 may determine that the first signed message passes DMARC. For instance, at step 211, message recipient server 140 may determine that the first signed message passes DMARC with respect to the second domain, based on determining at step 211 that the DKIM signature included in the message is valid at step 210.

At step 212, message recipient server 140 may provide access to the message. For example, based on determining that the first signed message passes DMARC with respect to the second domain, message recipient server 140 may allow a recipient (e.g., a user of message recipient user device 150) to view the message (e.g., in an inbox or other mailbox provided by message recipient server 140) and/or otherwise access contents of the message. Additionally or alternatively, when providing the recipient with access to the message, message recipient server 140 may provide the recipient with an indication (e.g., a user interface element) identifying that the message passed DMARC and/or is otherwise authenticated.

As illustrated above, by deploying and using a secure email relay (which may, e.g., be provided by secure relay computing platform 110 as described herein), authorized email messages that might otherwise fail DMARC and be quarantined by a recipient mail service can instead be properly authenticated and delivered to recipient users. In addition, by deploying the secure email relay in a cloud computing platform, additional technical benefits may be provided. For example, the secure email relay service may be updated more frequently and/or automatically across a plurality of different users, and the service may be relatively dynamic as the service may maintain real-time connections to antispam services, antivirus services, and/or other services that themselves may be updated to increase efficiency and effectiveness in real-time (e.g., as messages are being received and processed by the secure email relay). Additionally or alternatively, the secure email relay service (which may, e.g., by provided by secure relay computing platform 110) may be multi-tenancy such that it is shareable across different customer organizations for use in supporting emails originating from various other sources for the different customer organizations.

In some instances, in addition to or instead of facilitating messages to be sent by third-party service providers and/or Software as a Service (SaaS) applications, secure relay computing platform 110 may facilitate messages to be sent by Internet of Things (IoT) devices. In processing and sending messages sent by IoT devices, secure relay computing platform 110 may execute one or more steps similar to those described above, and an IoT device and/or its associated server(s) may execute one or more steps similar to those performed by message source server 120 in the examples described above.

In addition, while the steps of the example event sequence above have been described in a particular order, some steps may be performed in a different order and/or omitted in additional or alternative embodiments. For example, in some embodiments, one or more of steps 205, 206, 207, and 208 (e.g., in which a DKIM signature is injected, message content is scanned, scan results are validated, and the signed message is sent) may be performed in a different order.

In some instances, secure relay computing platform 110 thus may be used (e.g., to send messages that pass DMARC) in one or more scenarios shown in the following table:

TABLE A

| | Characteristics of Email Received by Secure Relay Computing Platform 110 from Message Source Server 120 | | Characteristics of Email Sent to Internet by Secure Relay Computing Platform 110 | |
|---|---|---|---|---|
| | Envelope From (RFC.5321) Domain | Header From (RFC.5322) Domain | Envelope From (RFC.5321) Domain | Header From (RFC.5322) Domain |
| Scenario 1 | @example-service-provider.com | @example-customer-of-the-service-provider.com | @example-service-provider.com | @example-customer-of-the-service-provider.com |
| Scenario 2 | @example-service-provider.com | @example-customer-of-the-service-provider.com | @example-customer-of-the-service-provider.com | @example-customer-of-the-service-provider.com |
| Scenario 3 | @example-customer-of-the-service-provider.com | @example-customer-of-the-service-provider.com | @example-customer-of-the-service-provider.com | @example-customer-of-the-service-provider.com |

Figure 3:
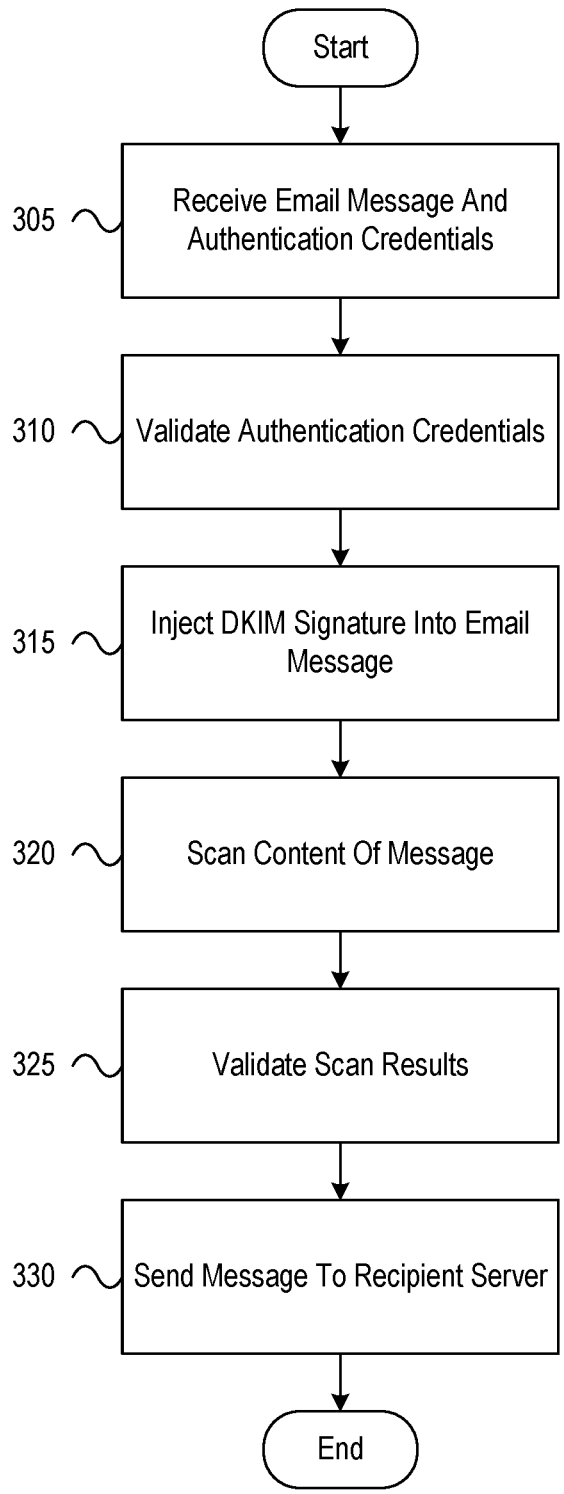
FIG. 3 depicts an illustrative method for processing external messages using a secure email relay in accordance with one or more example embodiments.

FIG. 3 depicts an illustrative method for processing external messages using a secure email relay in accordance with one or more example embodiments. Referring to FIG. 3, at step 305, a computing platform, having at least one processor, a communication interface, and memory may receive, via the communication interface, from a message source server associated with a first domain, a first email message and a first set of authentication credentials. At step 310, the computing platform may validate the first set of authentication credentials. At step 315, based on validating the first set of authentication credentials, the computing platform may inject, into the first email message, a Domain-Keys Identified Mail (DKIM) signature of a second domain different from the first domain, where injecting the DKIM signature of the second domain into the first email message produces a first signed message that identifies itself as originating from the second domain. At step 320, the computing platform may scan content of the first signed message, where scanning the content of the first signed message produces first scan results. At step 325, the computing platform may validate the first scan results. At step 330, based on validating the first scan results, the computing platform may send, via the communication interface, to a message recipient server, the first signed message, where sending the first signed message to the message recipient server causes the message recipient server to validate the DKIM signature of the first signed message and determine, based on validating the DKIM signature of the first signed message, that the first signed message passes Domain-based Message Authentication, Reporting and Conformance (DMARC) with respect to the second domain.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device.

The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface; and
memory storing computer-readable instructions that, when executed by the at least one processor, cause the computing platform to:
receive, via the communication interface, from a message source server associated with a first domain, a first email message and a first set of authentication credentials;
validate the first set of authentication credentials;
based on validating the first set of authentication credentials, inject, into the first email message, a DomainKeys Identified Mail (DKIM) signature of a second domain different from the first domain, wherein injecting the DKIM signature of the second domain into the first email message produces a first signed message that identifies itself as originating from the second domain, wherein the first signed message is produced without modifying a Header From (RFC.5322) domain and an Envelop From (RFC.5321) domain;
scan content of the first signed message, wherein scanning the content of the first signed message produces first scan results;
validate the first scan results; and
based on validating the first scan results, send, via the communication interface, to a message recipient server, the first signed message, wherein sending the first signed message to the message recipient server causes the message recipient server to validate the DKIM signature of the first signed message and determine, based on validating the DKIM signature of the first signed message, that the first signed message passes Domain-based Message Authentication, Reporting and Conformance (DMARC) with respect to the second domain.

2. The computing platform of claim 1, wherein the first domain is a domain name corresponding to a first entity, and the first email message comprises information identifying the first email message's Envelope From domain (RFC.5321) as the domain name corresponding to the first entity, and
wherein the second domain is a domain name corresponding to a second entity different from the first entity, and the first email message comprises information identifying the first email message's Header From domain (RFC.5322) as the domain name corresponding to the second entity.

3. The computing platform of claim 2, wherein the second entity is an organization, and the first entity is a third-party service provider to the organization.

4. The computing platform of claim 1, wherein validating the first set of authentication credentials comprises comparing the first set of authentication credentials received from the message source server associated with the first domain with pre-established credentials provided to one or more authorized users of a secure email relay service hosted on the computing platform.

5. The computing platform of claim 1, wherein scanning the content of the first signed message comprises executing an antispam-antivirus scan on the content of the first signed message.

6. The computing platform of claim 1, wherein sending the first signed message to the message recipient server causes the message recipient server to validate the DKIM signature of the first signed message by comparing the DKIM signature of the first signed message with a public key linked to the second domain and maintained on a domain name system (DNS) server.

7. The computing platform of claim 1, wherein sending the first signed message to the message recipient server causes the message recipient server to provide a recipient user with access to the first signed message based on the first signed message passing DMARC with respect to the second domain.

8. The computing platform of claim 7, wherein sending the first signed message to the message recipient server causes the message recipient server to provide the recipient user with access to the first signed message by adding the first signed message to a mail folder accessible to the recipient user without quarantining the message.

9. The computing platform of claim 7, wherein sending the first signed message to the message recipient server causes the message recipient server to provide the recipient user with access to the first signed message by sending the first signed message to a recipient user device.

10. A method, comprising:
at a computing platform comprising at least one processor, a communication interface, and memory:
receiving, by the at least one processor, via the communication interface, from a message source server associated with a first domain, a first email message and a first set of authentication credentials;
validating, by the at least one processor, the first set of authentication credentials;
based on validating the first set of authentication credentials, injecting, by the at least one processor, into the first email message, a DomainKeys Identified Mail (DKIM) signature of a second domain different from the first domain, wherein injecting the DKIM signature of the second domain into the first email message produces a first signed message that identifies itself as originating from the second domain, wherein the first signed message is produced without modifying a Header From (RFC.5322) domain and an Envelop From (RFC.5321) domain;
scanning, by the at least one processor, content of the first signed message, wherein scanning the content of the first signed message produces first scan results;
validating, by the at least one processor, the first scan results; and
based on validating the first scan results, sending, by the at least one processor, via the communication interface, to a message recipient server, the first signed message, wherein sending the first signed message to the message recipient server causes the message recipient server to validate the DKIM signature of the first signed message and determine, based on validating the DKIM signature of the first signed message, that the first signed message passes Domain-based Message Authentication, Reporting and Conformance (DMARC) with respect to the second domain.

11. The method of claim 10, wherein the first domain is a domain name corresponding to a first entity, and the first email message comprises information identifying the first email message's Envelope From domain (RFC.5321) as the domain name corresponding to the first entity, and
wherein the second domain is a domain name corresponding to a second entity different from the first entity, and the first email message comprises information identifying the first email message's Header From domain (RFC.5322) as the domain name corresponding to the second entity.

12. The method of claim 11, wherein the second entity is an organization, and the first entity is a third-party service provider to the organization.

13. The method of claim 10, wherein validating the first set of authentication credentials comprises comparing the first set of authentication credentials received from the message source server associated with the first domain with pre-established credentials provided to one or more authorized users of a secure email relay service hosted on the computing platform.

14. The method of claim 10, wherein scanning the content of the first signed message comprises executing an antispam-antivirus scan on the content of the first signed message.

15. The method of claim 10, wherein sending the first signed message to the message recipient server causes the message recipient server to validate the DKIM signature of the first signed message by comparing the DKIM signature of the first signed message with a public key linked to the second domain and maintained on a domain name system (DNS) server.

16. The method of claim 10, wherein sending the first signed message to the message recipient server causes the message recipient server to provide a recipient user with access to the first signed message based on the first signed message passing DMARC with respect to the second domain.

17. The method of claim 16, wherein sending the first signed message to the message recipient server causes the message recipient server to provide the recipient user with access to the first signed message by adding the first signed message to a mail folder accessible to the recipient user without quarantining the message.

18. The method of claim 16, wherein sending the first signed message to the message recipient server causes the message recipient server to provide the recipient user with access to the first signed message by sending the first signed message to a recipient user device.

19. One or more non-transitory computer-readable media storing instructions that, when executed by a computing platform comprising at least one processor, a communication interface, and memory, cause the computing platform to:
receive, via the communication interface, from a message source server associated with a first domain, a first email message and a first set of authentication credentials;
validate the first set of authentication credentials;
based on validating the first set of authentication credentials, inject, into the first email message, a DomainKeys Identified Mail (DKIM) signature of a second domain different from the first domain, wherein injecting the DKIM signature of the second domain into the first email message produces a first signed message that identifies itself as originating from the second domain, wherein the first signed message is produced without modifying a Header From (RFC.5322) domain and an Envelop From (RFC.5321) domain;
scan content of the first signed message, wherein scanning the content of the first signed message produces first scan results;
validate the first scan results; and
based on validating the first scan results, send, via the communication interface, to a message recipient server, the first signed message, wherein sending the first signed message to the message recipient server causes the message recipient server to validate the DKIM signature of the first signed message and determine, based on validating the DKIM signature of the first signed message, that the first signed message passes Domain-based Message Authentication, Reporting and Conformance (DMARC) with respect to the second domain.

20. The one or more non-transitory computer-readable media of claim 19, wherein the first domain is a domain name corresponding to a first entity, and the first email message comprises information identifying the first email message's Envelope From domain (RFC.5321) as the domain name corresponding to the first entity, and wherein the second domain is a domain name corresponding to a second entity different from the first entity, and the first email message comprises information identifying the first email message's Header From domain (RFC.5322) as the domain name corresponding to the second entity.

* * * * *